(No Model.)
H. W. McKINNE.
DISPLAY RACK.
No. 511,639. Patented Dec. 26, 1893.
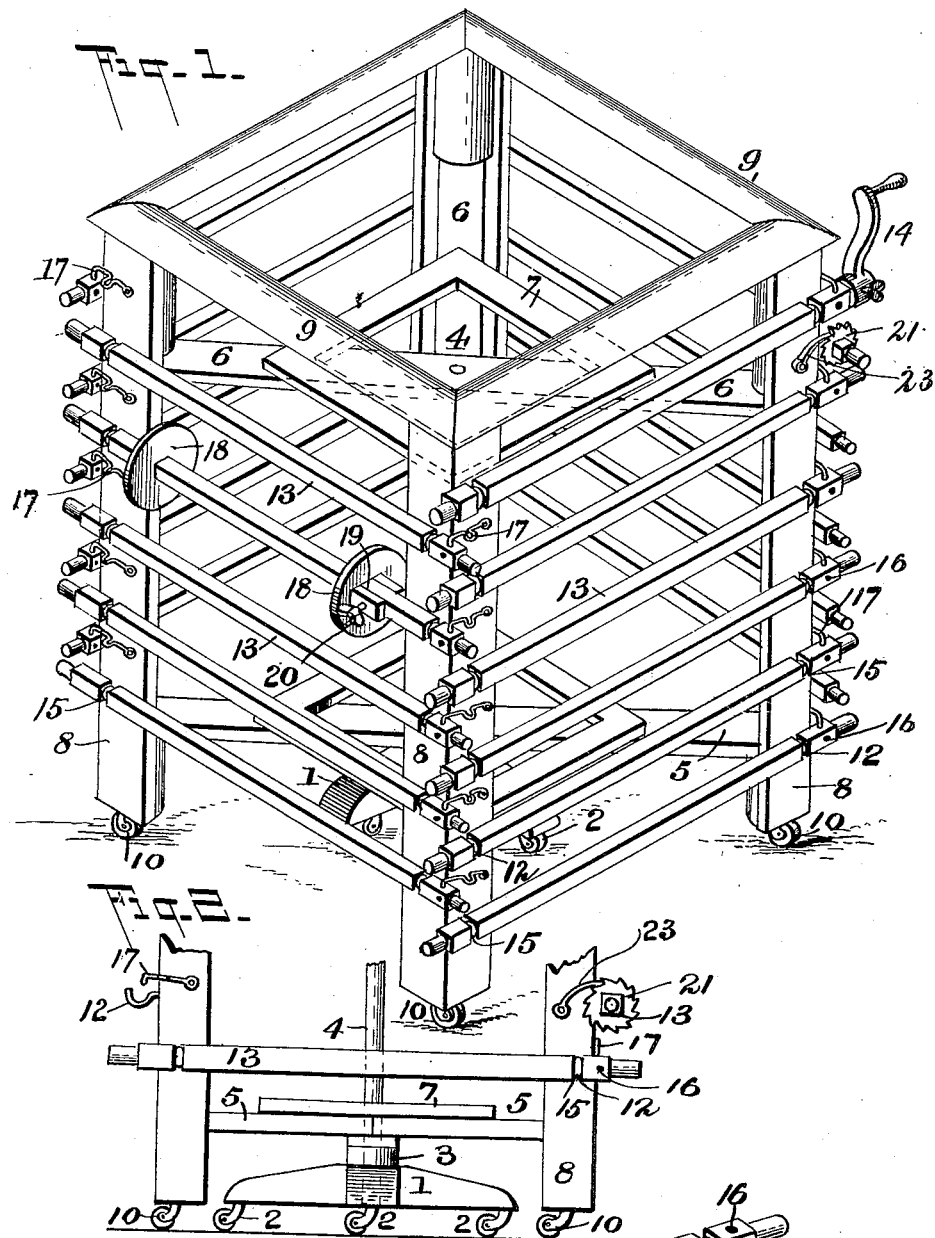
Witnesses:
F. L. Ouraud
J. O. Bloombs
Inventor:
Haywood W. McKinne
by Lewis Bagger & Co.
Attorneys.
THE NATIONAL LITHOGRAPHING COMPANY,
WASHINGTON, D. C.

UNITED STATES PATENT OFFICE.

HAYWOOD W. McKINNE, OF MOUNT OLIVE, NORTH CAROLINA.

DISPLAY-RACK.

SPECIFICATION forming part of Letters Patent No. 511,639, dated December 26, 1893.

Application filed February 13, 1893. Serial No. 462,140. (No model.)

*To all whom it may concern:*

Be it known that I, HAYWOOD W. MCKINNE, a citizen of the United States, and a resident of Mount Olive, in the county of Wayne and State of North Carolina, have invented certain new and useful Improvements in Display-Racks; and I do hereby declare that the following is a full, clear, and exact description of the invention, which will enable others skilled in the art to which it appertains to make and use the same, reference being had to the accompanying drawings, which form a part of this specification.

My invention relates to improvements in display racks, and is intended more particularly for the use of merchant tailors for displaying dress goods, although it is applicable to other similar purposes.

The object of the invention is to provide a novel device of the above character, which shall possess superior advantages with respect to efficiency in use.

The invention consists in the novel construction and combination of parts, hereinafter fully described and claimed.

In the accompanying drawings: Figure 1 is a perspective view of rack constructed in accordance with my invention. Fig. 2 is a side elevation of the lower part thereof. Fig. 3 is a detail view of one of the winding shafts detached.

In the said drawings, the reference numeral 1 designates a base, consisting in the present instance, of four radial arms, provided near their outer ends with casters 2, so that it may be readily propelled from place to place. This base is provided with a hub 3, to which is secured a vertical shaft 4, which passes through radial arms or bars 5, resting upon said hub and also through similar arms or bars 6, some distance above bars 5. These bars 5 and 6 are braced by means of bars 7 secured thereto, thus forming frames which are rotatable upon the shaft. The outer ends of bars 5 and 6, which extend outwardly beyond the arms 1, are secured to the uprights 8, four being shown in the present instance, although more or less may be employed as desired. At their upper ends, these uprights are connected together by means of bars 9, and at their lower ends are provided with casters 10. Each of the two outer faces of these uprights is formed with a series of aligned semi-circular hooks 12, which form the bearings of the angular rotatable winding shafts 13. It will be noted that the hooks on one face of the uprights are in different horizontal planes alternating with each other, so that the ends of the shafts on one side of the frame formed by the uprights and the radial arms 5 and 6, will pass between the ends of the shafts upon the other adjoining sides. The ends of the shafts are reduced to receive a removable crank 14, by which they may be rotated, and they are also provided with peripheral grooves 15, with which the hooked bearings engage. Intermediate these grooves and the reduced ends the shafts are formed with holes 16, to receive the ends of pivoted hooks 17, by which the shafts are held against rotation. There is one of these hooks for each shaft.

Mounted upon each of the winding shafts are adjustable guide disks 18, provided with arms 19, one of which has a set screw 20 for holding the disks in place. In Fig. 1, only one of the shafts is shown with these guide disks, but in practice all should be supplied with them.

In Fig. 2 I have illustrated the shafts as being provided with ratchet wheels 21, with which pawls 23 are adapted to engage to prevent said shafts from rotating. These may be employed instead or in lieu of the hooks 20.

The operation will be readily understood. The disks 18 are adjusted on the shafts according to the width of the material to be wound. One end of the said material is now secured to the shaft, and by rotating the latter by means of the cranks, the material is wound thereon, the hooks engaging with the holes in the shafts preventing backward movement thereof. To display the goods, the hooks are disengaged and by catching hold of one end of the material and pulling upon the same, a sufficient portion can be unwound, thus enabling it to be inspected and examined. Afterward it is again wound up as before.

The frame carrying the shafts can be rotated upon the base so that all the sides thereof can be brought into view, and casters on the ends of the uprights supporting the same, and the whole apparatus may be easily moved from place to place.

Having thus described my invention, what I claim is—

In a display rack, the combination with the base provided with the casters, the vertical shaft, the radial bars or arms through which said shaft passes, and the uprights secured to said bars or arms, provided with casters at their lower ends, of the curved bearings secured to the outer sides of said uprights, the angular rotatable shafts having peripheral grooves with which said bearings engage and formed with apertures near their ends, the pivoted hooks adapted to engage with said apertures, and the adjustable guide disks carried by said shafts, substantially as described.

In testimony that I claim the foregoing as my own I have hereunto affixed my signature in presence of two witnesses.

HAYWOOD W. McKINNE.

Witnesses:
 JNO. R. SMITH,
 JOHN A. ROYAL.